June 19, 1962 G. V. COPLAND ETAL 3,039,310
DENSITY METER
Filed April 2, 1959 3 Sheets-Sheet 3
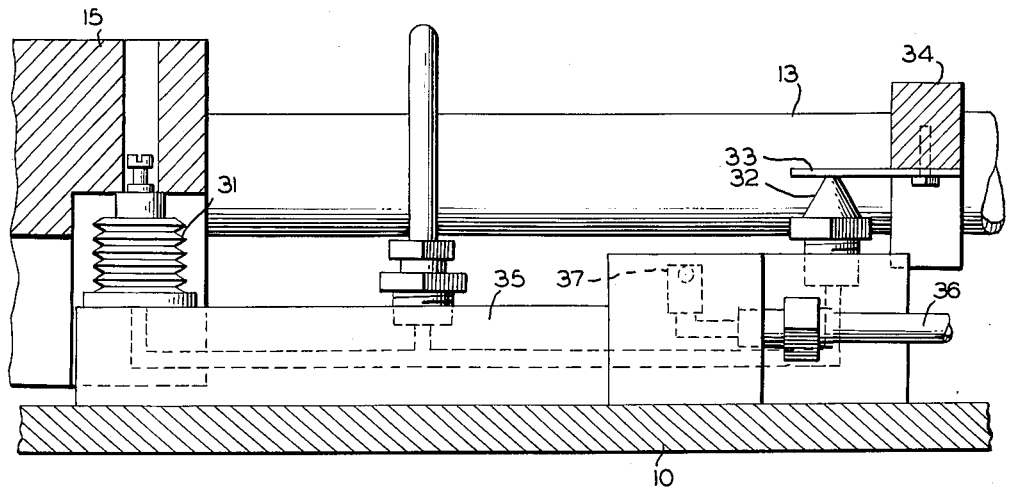
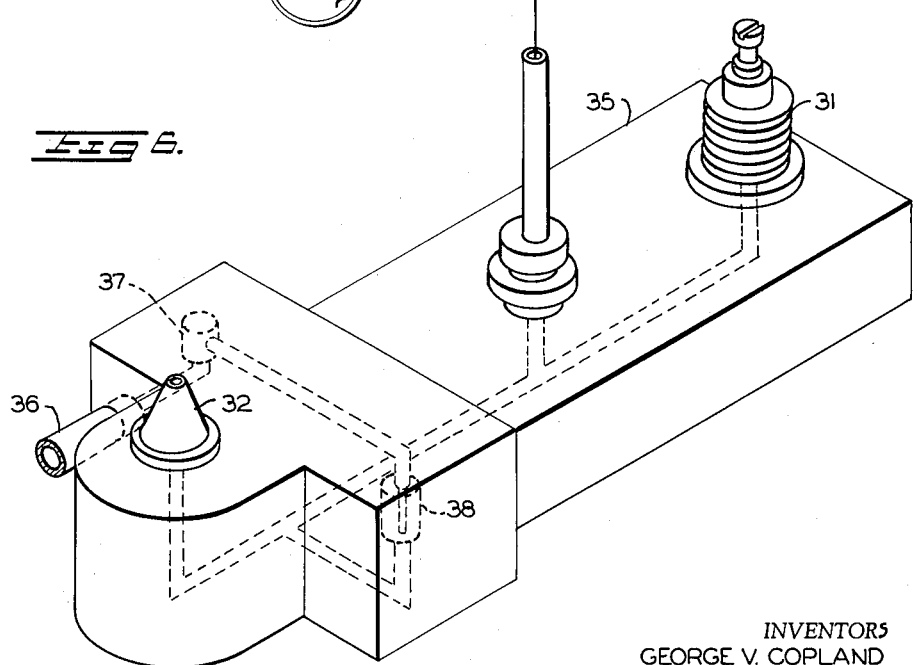
INVENTORS
GEORGE V. COPLAND
ROBERT G. LOVE
BY
Kenon & Palmer
ATTORNEYS

United States Patent Office 3,039,310
Patented June 19, 1962

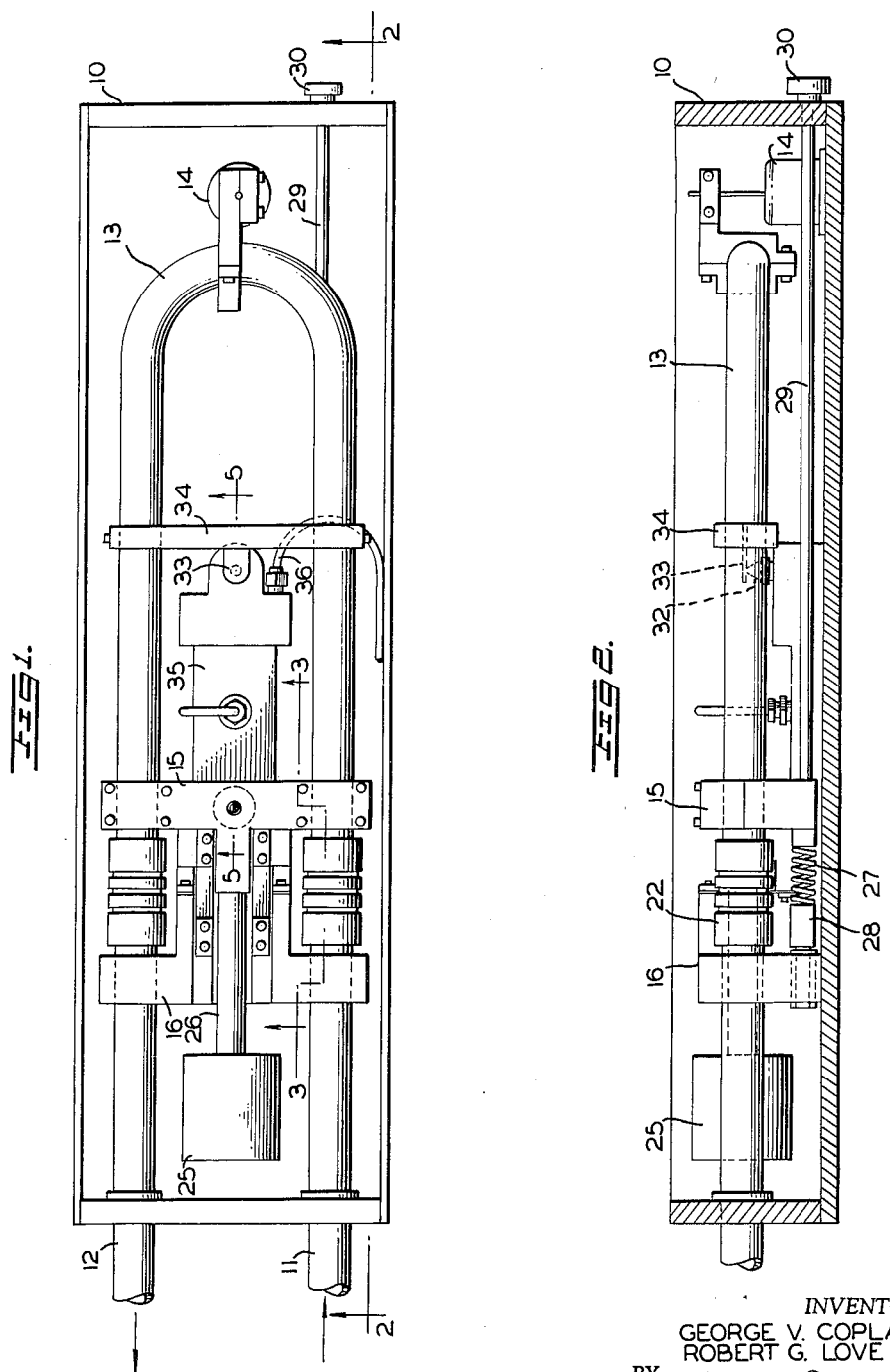

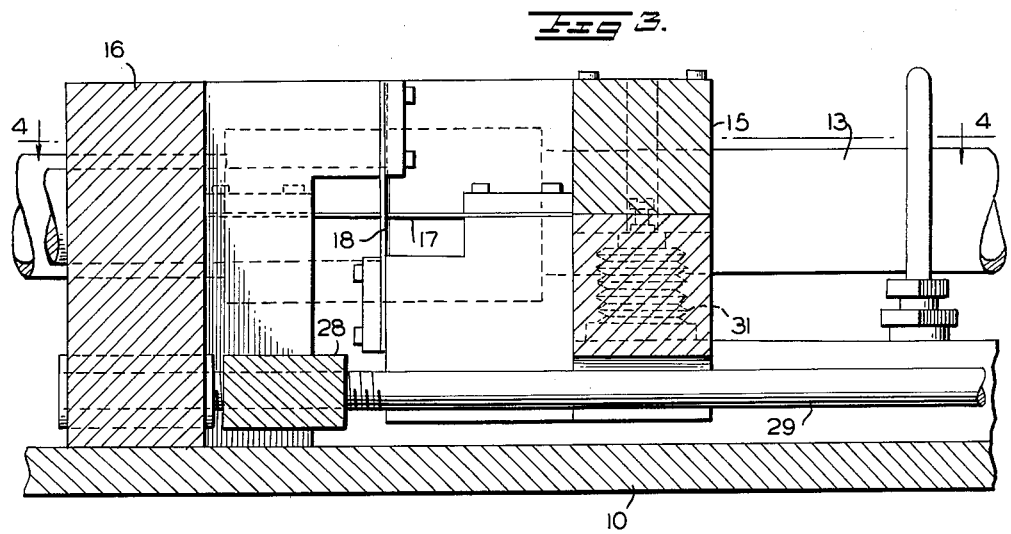
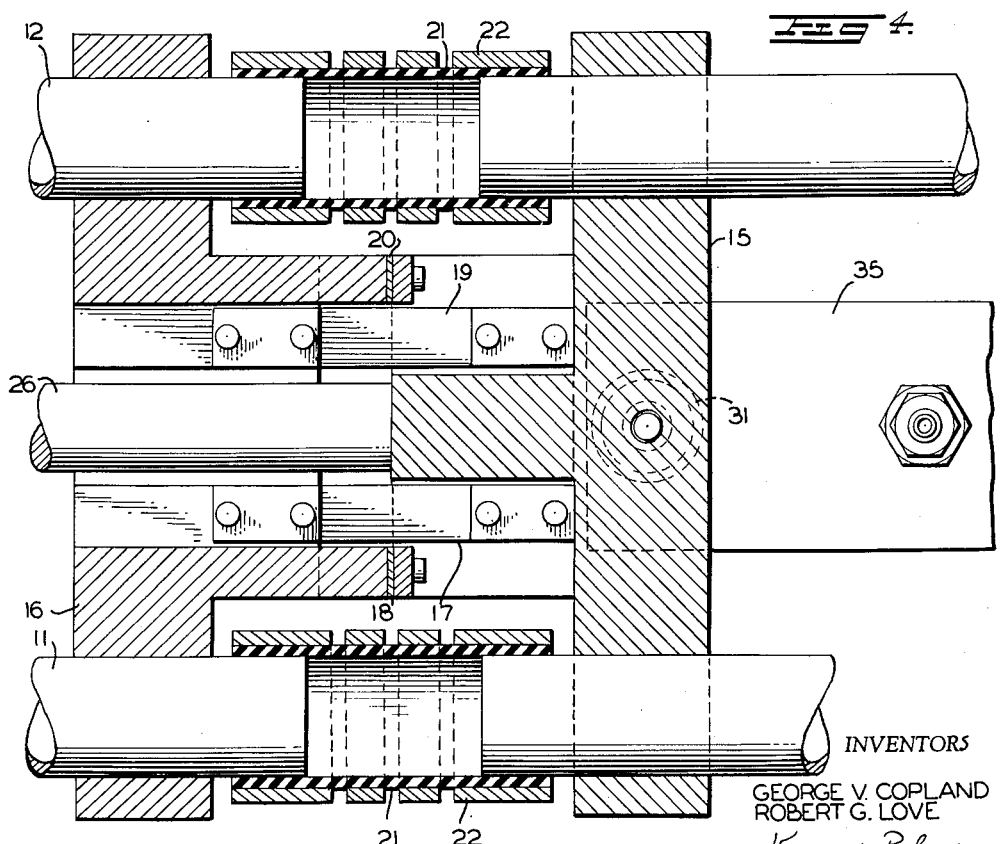

3,039,310
DENSITY METER
George V. Copland and Robert G. Love, Duncan, Okla., assignors to Halliburton Company, a corporation of Delaware
Filed Apr. 2, 1959, Ser. No. 803,772
6 Claims. (Cl. 73—434)

This invention relates to density meters and more particularly to density meters of the type which provide a continuous indication or recording of fluid density. While the specific embodiment of the present invention which will be hereinafter shown and described was developed primarily for the measurement of the density of fluids such as drilling fluids, cement slurries, fracturing fluids and the like used in well bore operations, it is not to be construed as limited to such use and in fact should have wide application in many spheres of industrial activity.

The need for apparatus of this type in the oil fields will be apparent to those skilled in the art upon consideration of the fact that in cementing operations for example, the cement slurry which is employed in any particular instance should have a uniform density throughout. Not only should this be true, but also the operator during cementing operations should be informed continuously as to whether the slurry being pumped is of the required density. A similar situation arises in connection with drilling operations. There again it is equally desirable for the operator to be furnished with a continuous indication of the density of the drilling fluid. In fracturing operations, the amount of sand carried in the fracturing fluid is, of course, reflected in density changes and here again, the operator should be advised at all times.

Prior art devices for continuous fluid density indication suffer from a number of drawbacks such as insufficient accuracy, bulk of equipment and expense of manufacture.

Accordingly, the principal objects of the present invention may be broadly stated as follows:

(1) To provide a fluid density meter which provides an extremely accurate and continuous indication of the density of a fluid which is flowing therethrough.

(2) To provide apparatus of this type which is rugged, extremely compact and readily portable.

(3) To provide a fluid density meter with a minimum number of moving parts.

(4) To provide a fluid density meter which is easily and inexpensively manufactured and which is readily dismantled for cleaning purposes.

Other objects of the present invention will be apparent from the following detailed description when taken in conjunction with the attached sheets of drawing in which:

FIG. 1 is a top plan view of a preferred embodiment of the present invention;

FIG. 2 is a side elevation of the apparatus shown in FIG. 1 taken on the line 2—2 of FIG. 1;

FIG. 3 is an enlarged view in side elevation on the line 3—3 of FIG. 1;

FIG. 4 is a top view in section on the lines 4—4 of FIG. 3;

FIG. 5 is a side elevation sectioned on the lines 5—5 of FIG. 1; and

FIG. 6 is a perspective view of parts of the apparatus shown in FIG. 5.

In general, the objects of the present invention are achieved by providing a movable looped conduit through which the fluid whose density is to be measured is pumped and utilizing this same looped conduit as a weighing beam in order to indicate density by measuring the amount of force necessary to restore the weighing beam to its original position. An extreme degree of compactness is possible by making the fluid carrying loop serve a double purpose. In other words, no separate weighing beams are necessary for successful practice of the invention. A pneumatically operated servo system which acts directly on the fluid density loop is operative to maintain a balance in the system and the pneumatic pressure is continuously measured in order to provide the desired continuous indication of the density of fluid flowing through the combined density loop and weighing beam.

Referring first to FIGS. 1 and 2 of the attached sheets of drawings, the physical compactness of the present unit will be immediately apparent. Within the housing 10 are housed all of the components of the present apparatus with the exception of the indicating means which may preferably be located at a point remote from the location of the remainder of the apparatus.

Fixedly secured within the housing but extending outwardly thereof in order to afford connection to a source of fluid, the density of which is to be measured are inlet and outlet conduits 11 and 12 respectively. The double purpose weighing beam-looped conduit hereinafter referred to as the looped conduit in shown at 13 and its open ends are connected to fixed conduits 11 and 12 in a fluid tight connection, the details of which will be described hereinafter. At the outer end of the looped conduit 13, there is shown in FIGS. 1 and 2 a dashpot 14. The dashpot is, of course, fixedly carried by the housing 10 and its movable element is attached to the outer end of the member 13 by any suitable means such, for example, as the clamp illustrated in these figures. Referring now to FIGS. 3 and 4, for a detailed description of the flexible mounting of the looped conduit 13 with respect to fixed conduits 11 and 12, it will be seen in FIG. 3 that the inner ends of the looped conduit 13 are connected by means of a saddle-like member designated generally by the reference numeral 15. The adjacent ends of the fixed conduits 11 and 12 are also joined by a similar saddle or block member designated generally by the reference numeral 16. Extending between these two saddles or blocks are two pairs of flat leaf springs 17, 18, 19 and 20. From FIG. 4, it will be seen that one pair of these springs is mounted on either side of the center line of the apparatus and each pair is just inboard of the free ends of conduits 11, 12 and 13. As shown most clearly in FIG. 3, the springs of each pair are perpendicular to each other, one being in the horizontal and one in a vertical plane. Assuming then a flexible connection between the fixed conduits and the looped conduit 13, it will be apparent that the spring support means is such as to permit the conduit 13 to deflect upwardly and downwardly with respect to the fixed conduits 11 and 12.

Although the flexible connection could take any number of forms, one preferred form is detailed in FIG. 4. The flexible coupling shown therein comprises an inner rubber or other suitable flexible member 21 which is bonded to what originally was a rigid cylindrical member 22. Following the bonding step, the member 22 was simply cut away in three annular cuts as shown in order to provide a flexible coupling.

Returning now to FIGS. 1 and 2, the parts just described with reference to FIGS. 3 and 4 will appear therein but in somewhat reduced size. It will be apparent however, that the looped conduit 13 is free to deflect in a vertical plane at the point of spring suspension by reason of the flexible coupling means. The conduit 13 must, of course, be counterbalanced, and a counterbalancing weight for this purpose is shown at 25 in FIGS. 1 and 2. The counterbalance is preferably adjustably mounted on a shaft 26, the opposite end of which is rigidly attached to the saddle member 15. The adjustability feature may be by way of a threaded connection between the counterbalance 25 and its shaft 26 and a set screw may be provided for locking the counterbalance on its shaft.

Referring again to FIG. 3, an important geometrical relationship should be pointed out. If we consider that each of the flat springs 17 to 20 inclusive are capable of defining a plane surface, and since corresponding springs of each pair are identically located on either side of the center line of the apparatus, it will be seen particularly in FIG. 3 that a line defined by the intersection of two planes established by corresponding springs of each pair will pass through the geometric center of the two flexible couplings.

Since it will be desirable to provide a zero adjusting mechanism operable externally of the housing, such adjustment has been provided and has been shown most clearly in FIGS. 1 to 3 inclusive. A tension spring 27 shown in FIG. 2 is connected at one end to the saddle member 15 and at its opposite end to a block 28. The block 28 is internally threaded to threadedly engage an adjusting rod 29. The rod 29 extends substantially the full length of the housing 10 and terminates at a point outside the housing in an adjusting knob 30. At its opposite end, the rod 29 is slidably received within a recess in the saddle member 16. Rotation of the rod 29 by means of the handle 30 will tend to increase or decrease the tension in the spring 27, and therefore exert a force on the movable density loop 13, tending to urge the loop in a clockwise direction about its pivot axis. The pivot axis, of course, would be that axis which is defined by a line formed by the intersection of the two planes which are established by the two pairs of leaf springs 17 to 20 inclusive.

The function of the remaining apparatus shown in the accompanying drawings is to provide a pneumatic servo rebalancing mechanism to which can be coupled an indicator to yield a continuous indication of the density of a fluid which is continuously flowing through the looped conduit 13.

The essential components of the pneumatic servo system are shown in FIGS. 5 and 6. A bellows 31 is positioned beneath the saddle member 15 as shown. This bellows, when it is supplied with air under pressure, exerts an upward force on the looped conduit, which force will tend to neutralize the downward or clockwise force exerted by the weight of the fluid flowing through the loped conduit 13. In order that movements of the looped conduit will control the degree of rebalancing force applied through the bellows 31, the air line which supplies air under pressure to the bellows is vented to the atmosphere by means of a valve shown at 32. A flap valve member 33, which cooperates with the valve 32 is carried by a saddle 34 which is rigidly attached to the looped conduit 13. Keeping in mind that the maximum deflections of the looped conduit are small, it will be seen that the further down or clockwise looped conduit 13 moves, the more fully closed becomes the valve 32 by reason of the valve member 33 pressing on the top thereof. A complete closing of the valve 32 results in substantially full line pressure being applied to the bellows 31 and therefore a maximum rebalancing force. The further the beam 13 moves upwardly or counterclockwise, the more air pressure is bled to the atmosphere through the valve 32 and therefore the lower is the pressure within the bellows 31 and the less force is exerted to tend to restore the weighing beam to a position of zero deflection.

For convenience in manufacture and assembly, and also to provide a reasonable basis for minor adjustment of the system, the air line, the bellows 31 and the valve 32 are preferably all mounted in a unitary block assembly 35 as shown in FIG. 6. This block 35 is preferably adjustably mounted on the base of the housing 10. The particular air circuit shows most clearly in FIG. 5 and may be readily traced as follows: air under pressure is admitted through line 36 and passes first through a filter 37; next in the line of air flow is a restriction 38, following which there is a direct connection to the valve 32, the bellows 31, and an indicating instrument 40. It will be noted that the pressure in the air system downstream of the restriction 38 will be controlled by the valve 32 by reason of the valve member 33, and that this pressure will therefore afford a means of measuring the force necesary to rebalance the weighing beam-looped conduit 13. The area of the restriction 38 is made less than the area of the full opening of the valve 32. The indicating means 40 therefore which is responsive to fluid pressure, may be suitably calibrated in density units so as to give a visual continuous indication of the density of fluid traversing the looped conduit 13. While shown diagrammatically in FIG. 6 as an indicating instrument of the pointer and dial type, it will be obvious that a recording type of indicator may also be used with equal results.

From the foregoing it will be apparent that there is herein shown and described a new and useful density meter for yielding continuous indications or records of the density of a flowing fluid. While a preferred embodiment has been herein shown and described, variations will be apparent to those skilled in the art and applicants are entitled to the benefit of a full range of equivalents within the scope of the appended claims.

We claim:

1. Fluid density measuring apparatus comprising in combination: fixed inlet and outlet fluid carrying conduits; a weighing beam comprising a counterbalanced, looped, fluid-carrying conduit; flexible fluid carrying conduits interconnecting said inlet and outlet conduits and said looped conduit, permitting said looped conduit to deflect with respect to said fixed conduits in response to the weight of fluids pumped therethrough; two pairs of flat leaf springs, opposite ends of each pair being connected to said looped and fixed conduits, the springs of each pair being adjacent and at right angles to each other and the pairs being so located that a line defined by the intersection of two planes, each established by corresponding springs of each pair passes through the centers of said flexible conduits; a movable air actuated element directly connected to said looped conduit and operative when energized to urge said looped conduit toward a position of zero deflection; means including an air line affording connection of air under pressure to said element; a valve in said air line venting said line to the surrounding atmosphere; a movable valve member, carried by said looped conduit and cooperating with said valve to control the pressure applied to said element in accordance with deflections of said looped conduit, said looped conduit therefore serving as its own weighing beam; and pressure responsive indicating means connected to said air line for continuously indicating the density of fluids supplied to said looped conduit from said inlet conduit.

2. Fluid density measuring apparatus as defined by claim 1 and including a dash pot connected between said looped conduit and a support fixed with respect to said conduit.

3. Fluid density measuring apparatus as defined by claim 1 including means for adjusting the position of zero deflection of said looped conduit.

4. Fluid density measuring apparatus comprising in combination: a housing, inlet and outlet fluid conduits fixedly secured in said housing; a horizontally disposed U-shaped conduit within said housing; a pair of flexible conduits interconnecting said U-shaped and inlet and outlet conduits; two pairs of flat springs supporting said looped conduit in said housing adjacent said flexible conduits, the springs of each pair being adjacent and at right angles to each other and corresponding springs in each pair being parallel and so positioned that a line formed by the intersection of two planes established by corresponding springs of each pair passes through the geometric center of said flexible conduits; first and second rigid saddles interconnecting the legs of the U-shaped conduit, said first saddle adjacent the free ends thereof and said second saddle spaced outwardly therefrom; an air actuated bellows adjustably and fixedly secured to said housing beneath said first saddle; an air line for supplying air under pressure to said bellows; a valve in said air line venting said line to the surrounding atmosphere; a valve member carried by said second saddle and cooperating with said valve; a restriction in said air line upstream of said valve and bellows; and pressure responsive indicating means connected to said air line downstream of said restriction affording a continuous indication of density of fluid flowing in said looped conduit.

5. Fluid density measuring apparatus as defined by claim 1 in which said element and said valve are mounted on a common block member positioned beneath said weighing beam.

6. Fluid density measuring apparatus as defined by claim 4 in which said bellows, valve, and restriction are all mounted in fixed relation to each other on a common block member positioned beneath said looped conduit.

References Cited in the file of this patent

UNITED STATES PATENTS

| | | |
|---|---|---|
| 1,988,527 | Truman | Jan. 22, 1935 |
| 2,459,542 | Rosenberger | Jan. 18, 1949 |
| 2,883,177 | Dannehl et al. | Apr. 21, 1959 |
| 2,987,923 | Hoeppel et al. | June 13, 1961 |

FOREIGN PATENTS

| | | |
|---|---|---|
| 776,926 | Great Britain | June 12, 1957 |

OTHER REFERENCES

"Instrument Practice," published by United Trade Press Ltd.; vol. 8, No. 5, page 447; May 1954. (Copy in Div. 36.)

Republic Co. Pneumatic Transmission Data Book No. 1001, published August 1945, pp. 4 and 5 relied on. (Copy in Div. 36.)